(12) United States Patent
Goluch et al.

(10) Patent No.: US 6,359,527 B1
(45) Date of Patent: Mar. 19, 2002

(54) DETERMINING WAVESHAPER ATTENUATION SETTINGS FOR NETWORK INTERFACE UNIT

(75) Inventors: John C. Goluch, Aurora; Christopher F. Simanonis, Winfield; George G. Wagner, Naperville; Mark S. Ziermann, Bolingbrook, all of IL (US)

(73) Assignee: Westell Technologies, Inc., Aurora, IL (US)

( * ) Notice: Subject to any disclaimer, the term of this patent is extended or adjusted under 35 U.S.C. 154(b) by 0 days.

(21) Appl. No.: 09/714,771

(22) Filed: Nov. 16, 2000

Related U.S. Application Data

(63) Continuation of application No. 09/086,633, filed on May 29, 1998, now Pat. No. 6,188,763.

(51) Int. Cl.$^7$ .................................................. H04B 3/04
(52) U.S. Cl. ...................... 333/20; 379/347; 379/413.02
(58) Field of Search .......................... 379/347, 413.02; 333/20

(56) References Cited

U.S. PATENT DOCUMENTS

| | | |
|---|---|---|
| 3,496,308 A | 2/1970 | Godfrey |
| 3,863,031 A | 1/1975 | Cook |
| 4,821,286 A | 4/1989 | Graczyk et al. |
| 5,121,424 A | 6/1992 | Mano |
| 5,195,132 A | 3/1993 | Bowker et al. |
| 5,444,776 A | 8/1995 | Sheets et al. |
| 5,506,885 A | 4/1996 | Hamilton |
| 5,521,977 A | 5/1996 | Bergstrom et al. |
| 5,566,161 A | 10/1996 | Hartmann et al. |
| 5,592,545 A | 1/1997 | Ho et al. |
| 5,631,956 A | 5/1997 | Bergstrom et al. |
| 5,862,200 A | 1/1999 | Sheets |
| 5,907,614 A | 5/1999 | Bergstrom et al. |

*Primary Examiner*—Tālivaldis Ivars Smits
(74) *Attorney, Agent, or Firm*—McDermott, Will & Emery

(57) ABSTRACT

An improved, more intelligent network interface unit capable of processing signals received from a high speed transmission media and outputting the received signals without substantial amplification or reduction. The network interface unit comprises a regenerator circuit which detects T1 signals from said high-speed transmission media and outputs a digital stream to a serial data processor for processing via a micro-controller. A wave shaper circuit receives the output from the serial data processor and, in conjunction with the micro-controller and a level detector circuit, regenerates signals having substantially the same wave shape and amplitude as the original T1 signals received from said transmission media.

6 Claims, 4 Drawing Sheets

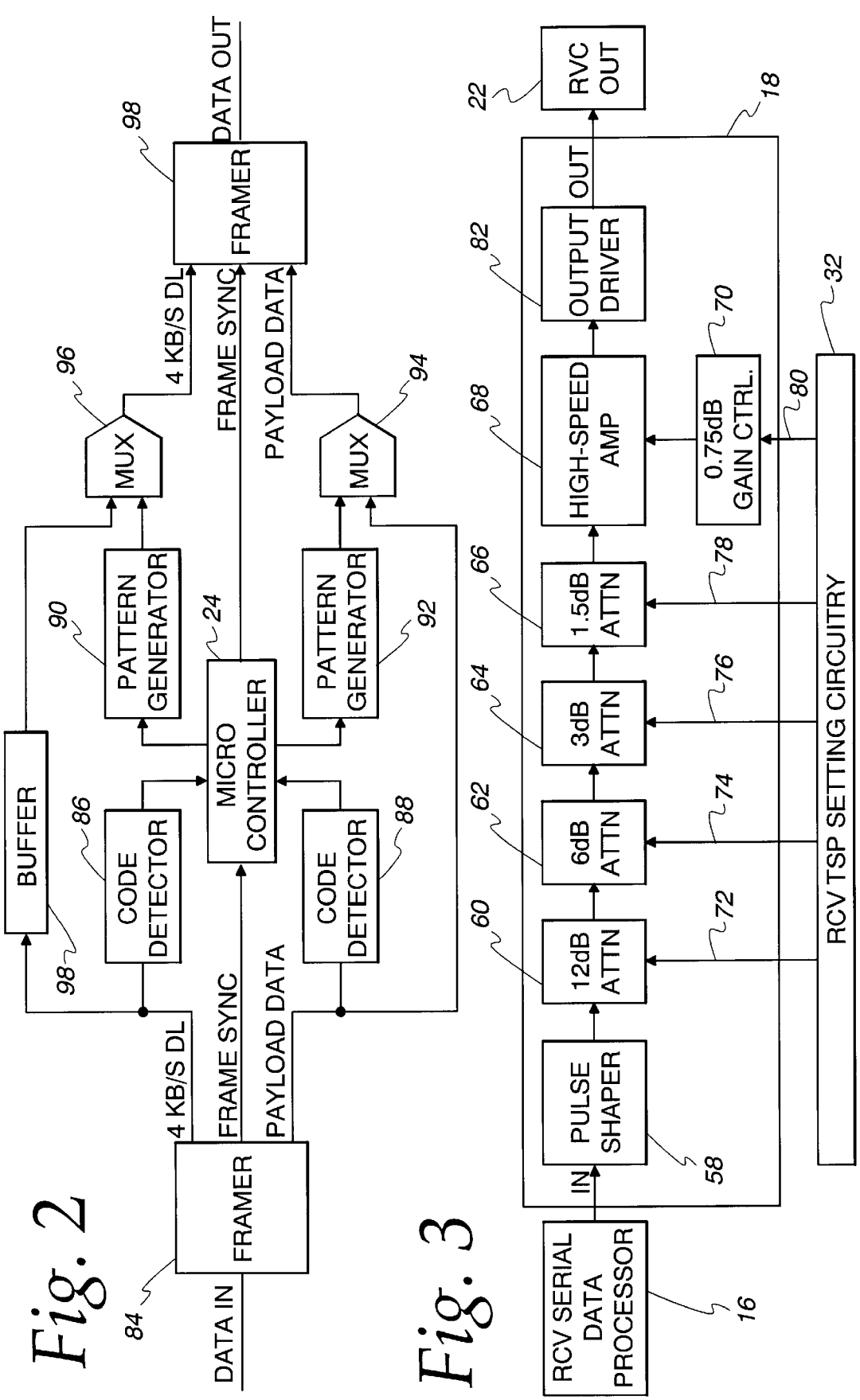

DETERMINING WAVESHAPER ATTENUATION SETTINGS FOR NETWORK INTERFACE UNIT

This application is a continuation of application Ser. No. 09/086,633, filed May 29, 1998, now U.S. Pat. No. 6,188,763, entitled "Signal Processing Unit For Network Interface Unit", incorporated herein by reference.

FIELD OF THE INVENTION

This present invention relates generally to interface units on high-speed digital transmission line systems. More particularly, to circuitry which allows signals going into a Network Interface Unit (NIU) to be processed or modified and transmitted by the NIU back to the transmission line system without substantial signal level reduction or amplification.

BACKGROUND OF THE INVENTION

As discussed in U.S. Pat. No. 5,444,776 to Sheets, NIUs are typically located at the interface between a network transmission line and a customer premises. In general operation, when a NIU receives a signal on a digital transmission line from the central office, the NIU, in turn, passes the signal to equipment on the customer premises. Similarly, when the NIU receives a signal from the customer premises, the NIU passes that signal to the central office on the digital transmission line.

The present invention may be used with digital transmission lines generally, including, for example, the Regional Bell Telephone Systems in the United States. The Bell Telephone System has widely utilized time multiplexed pulse code modulation systems. Such systems have generally been designated as "T1 carriers." Each T1 system carries twenty-four two way channels on two pairs of exchange grade cables. One pair of cables provides communication in each direction. The information on such a pulse code modulated system is transmitted in the form of bipolar or alternate mark inversion (AMI) pulses.

The data to be transmitted over the cables, such as speech, is typically sampled at a rate of 8,000 Hertz, and the amplitude of each signal is measured. The amplitude of each sample is compared to a scale of discrete values and assigned a numeric value. Each discrete value is then encoded into a binary form. Representative binary pulses appear on the transmission lines.

Payload signals in binary pulse form are received by the telephone company central office and, generally, are transmitted, via cables, to a series of regenerative signal repeaters ("line repeaters" or signal repeaters"). Such repeaters are spaced along the cables approximately every mile. The first repeater receives the data from the central office, but, because of transmission line losses, noise, interference, and distortion, the signal will have degraded. The repeater recognizes the presence or absence of a pulse at a particular point in time and, thereafter, if appropriate, regenerates a clean, new pulse. Regenerative repeaters are powered by an office repeater through the transmission cable itself to generate the new pulses. The new pulses are transmitted by the line repeater along more cable to either another line repeater or to a NIU.

Some NIUs have the capability to identify errors in the data received over the cable and responsively provide a signal to the central office that the errors have occurred. Errors that can be detected by the NIU include, for example, errors in signaling, format, bipolar violations, out of frame data, loss in signal or loss of power, as well as the disconnection of equipment by the customer. NIUs may include regeneration toward the customer premises. Similarly, a NIU may include regeneration in the opposite direction.

NIUs may also include a "loopback" feature that allows the central office to ascertain whether or not a particular span of cable provides continuity along its entire length. For example, the central office may send, via the digital transmission lines, an activating signal, which may or may not interfere with normal transmission operations, that designates the NIU to "loop back" a signal to the central office. If no break is present on transmission lines, the central office test equipment will receive the same signal that it transmitted. The central office test equipment can now compare the transmitted signal to the received signal to obtain an accurate error count.

Efficient information gathering and system monitoring is obviously desirable in a NIU. NIUs currently available, however, do not process and input data into the digital stream primarily due to signal level transmission requirements put in place by the Federal Communication Commission (FCC). For competitive reasons, the details of which are not important here, FCC regulations inherently require that the level of a signal going into a NIU be substantially the same as the level of the corresponding signal which is transmitted by the NIU. Line repeaters typically can only handle −7.5 dB to −35 dB reference signals. Line Build Out (LBO) circuitry in customer equipment, such as Customer Service Units (CSU), sets the signal to the proper transmission level before it enters the network boundary at the Network Interface. This level must be properly set so that the signal closely matches other signals in the network binder cables that carry the DS-1 lines to the first Line Repeater location. Matching the signal levels decreases the chance of crosstalk occurring in the binder groups. The signal level must also be adjusted so that the level is within the operating range of the Line Repeater. If a NIU, which must regenerate digital signals at 0 dB reference levels in order to process an incoming T1 data stream, transmits signals at the 0 dB reference level, line repeaters may function improperly and crosstalk may be introduced into the binder cables. Consequently, it has been impossible to effectively process a binary pulse data stream in existing NIUs without substantially affecting dB reference levels, and in turn network equipment.

There are disclosed in the art systems for remotely monitoring and testing the performance of telephone circuits (U.S. Pat. No. 5,566,161 to Hartmann et al.); for maintaining signal levels over remote lines (U.S. Pat. No. 3,496,308 to Godfrey); for regenerating signals without introducing frequency shift or changing signal direction (U.S. Pat. No. 3,863,031 to Cook); for amplifying, re-shaping and retiming signals U.S. Pat. No. 4,821,286 to Graczyk); and for monitoring signal transmission for purposes of communication and maintenance purposes such as framing detection (U.S. Pat. No. 5,521,977 to Bergstrom).

The Hartmann '161 patent discloses a network interface unit that regenerates and processes incoming digital signals to monitor and test the performance of telephone circuits.

The Godfrey '308 patent discloses a system for maintaining signal levels of telephone messages over remote lines. The gain of amplifiers placed at repeaters and remote stations are automatically adjusted to compensate for variations and losses in transmission lines. The system compensates automatically for all fluctuation in the lines which causes a need for gain control. To accomplish this, the signal coming from a central office is monitored continuously, with the control device increasing or decreasing the gain of repeaters as necessary.

The Cook '031 patent discloses a signal processing system whereby a pulse or pulses of predetermined frequency and duration are filtered and regenerated, with the regenerated signal closely approximating the frequency and duration of the original pulse.

The Graczyk '286 patent is a digital signal regenerator which receives a four-level input signal and amplifies, reshapes and retimes that signal into a regenerated four-level output signal. The four-level signal system ostensibly increases the rate of information flow without substantially increasing the operational frequency.

The Bergstrom '977 patent discloses a network interface unit requiring less shelf space than the existing network interface units. Utilizing a single planar circuit board assembly to connect incoming and outgoing telephone lines, a higher density network interface unit is achieved to provide and monitor framing, detecting and monitoring signals and converting bipolar data to unipolar data None of the above-described systems discloses a NIU which accepts one or more high-speed digital signals, inputs information into the signals and dynamically regenerates the signals to their original wave shape and amplification, such that the processing of the NIU is transparent to external equipment. A system encompassing such features would result in a more "intelligent" NIU, allowing more efficient transmission line monitoring and the ability to communicate with other network elements at more points along the transmission system. Accordingly, there is a need in the art for a NIU which processes and inputs data into a digital data stream for improved monitoring and detection purposes, and regenerates the original signal such that the function of the NIU is transparent to external equipment.

SUMMARY OF THE INVENTION

It is one of the principal objectives of the present invention to provide an improved, more intelligent, network interface capable of processing T1 or similar signals received from a high speed transmission media. Processing of these signals includes monitoring transmissions for use by the network interface and reporting results to other equipment in the transmission path. The present invention accomplishes this objective using a regenerator circuit for detecting an input signal from a transmission media and outputting a regenerated signal, a circuit for processing said regenerated signal to produce a processed signal, a detector circuit for detecting one or more characteristics of said input signal and outputting a characteristic signal dependent upon said one or more characteristics, and a wave shaper circuit for receiving said processed signal and said characteristic signal, for modifying said processed signal based on said characteristic signal and generating an output signal.

It is a further object of the invention for said wave shaper circuit to generate output signals which have substantially the same wave shape and amplitude as the original input signals received from the transmission media, such that the processing performed by the NIU is transparent to external network and customer equipment.

It is a further object of the invention to detect one or more characteristics of an input signal received from a transmission media, to insert a message into said input signal, and to output a characteristic signal dependent upon one or more of said characteristics.

These and other objects, features, and advantages of the present invention are discussed or are apparent in the following detailed description.

BRIEF DESCRIPTION OF DRAWINGS

Preferred embodiments of the present invention are described herein with reference to the following drawings:

FIG. 2 is a block diagram of the serial data processor.

FIG. 3 is a block diagram of the wave shaper circuit.

DETAILED DESCRIPTION OF THE PREFERRED EMBODIMENT

Figure 1:
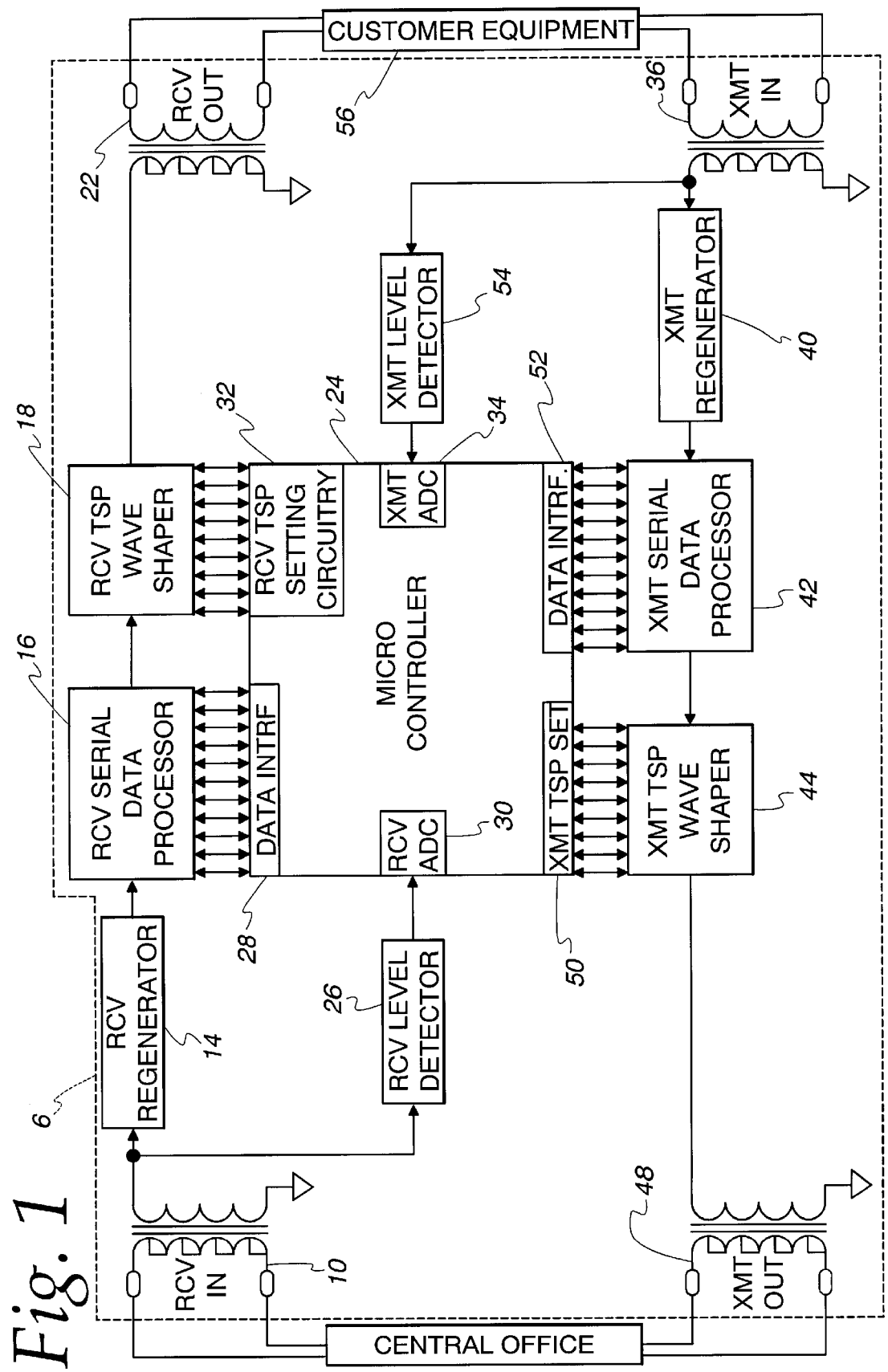
FIG. 1 is a block diagram of a NIU incorporating a regenerator circuit, a level detector circuit, a serial data processor, a micro-controller and a wave shaper circuit according to the invention.

FIG. 1 is a block diagram of a NIU according to the present invention. While the embodiment in FIG. 1 discloses a network interface unit operating at a connection point between a network transmission line and customer equipment, it should be understood that the present invention could operate at any position along a network. The NIU 6 receives signals from a central office 8 at RCV IN 10. The NIU 6 transmits signals to customer equipment 56 at RCV OUT 22. Similarly, at XMT IN 36, the NIU 6 receives signals from customer equipment 56 which may be transmitted back to the central office 8 from XMT OUT 48.

The description to follow discusses operation and components in the path of a signal received from the central office 8 and transmitted to the customer equipment 56. The operation of the NIU 6 and the components in the reverse path, from customer equipment 56 to central office 8, is identical. In particular, the XMT IN 36 port is identical to the RCV IN 10 port, the XMT OUT 48 is identical to RCV OUT 22, the XMT Serial Data Processor 42 is identical to the RCV Serial Data Processor 16, the data interface 52 is identical to the data interface 28, the XMT TSP SET 50 is identical to the RCV TSP SET 32, the XMT TSP Wave Shaper 44 is identical to the RCV TSP Wave Shaper 18, and the XMT level detector 54 is identical to the RCV level detector 26.

Referring to FIG. 1, T1 or other similar transmissions are received at RCV IN 10 and coupled to the regenerator 14. The regenerator 14, of a kind which is well known in the art, detects the transmitted signals and regenerates a digital output to the serial data processor 16. The serial data processor 16 performs all real-time processing of the digital data stream. The data stream can be processed for monitoring, detection, communication, message generation or any purpose which will make the NIU a "more intelligent" module. In one embodiment of the invention, data can be inserted into the data stream. Information inserted into the data stream may include, but is not limited to, error messages, sectionalization signals, performance information such as ANSI T1.403 PRM and NPRM messages, or general communication between elements. Processing is controlled by micro-controller 24 via data interface 28. In the embodiment shown, the output of the serial data processor 16 is a tri-state digital output (+5V-Open-Gnd).

FIG. 2 is a block diagram of the serial data processor 16. The serial data processor 16 includes framer 84 which detects frame bits at particular intervals. Code detectors 86 and 88 look for specific data patterns in the incoming multiplexed data link and payload channels, respectively. Data link information is processed at a rate of 4 Kb/sec and carries control or request commands from the central office 8 or customer equipment 56. The payload data is processed at a rate of 1.536 Mb/s with each frame consisting of 24 8-bit channels. The remaining 4 Kb/sec of the 1.544 Mb/s data stream are framing bits and CRC bits that guarantee data validity.

The micro-controller 24 controls pattern generator 90 and pattern generator 92 and sends messages into the data stream via the pattern generators 90 and 92 and mux's 94 and 96. The buffer 98 delays and stores data until there is enough channel space for messages to be inserted into the data stream. The space determination is made by the number of idle codes received and detected by code detector 86. The data stream output from mux 94 and mux 96 enters framer 98 where the processed data link and payload information are synchronized and transmitted in frames to the wave shaper 18 circuit. Other types of serial data processors which can perform these operations are well-known in the art, and may be used interchangeably here with modifications easily understood by one skilled in the art.

Referring to FIG. 1, the wave shaper 18 receives tri-state digital signals from the serial data processor 16 and regenerates signals having approximately the same amplitude and wave shape as the original signals received at the RCV IN 10 port. The original signal transmissions start off from their source at a 0 dB reference level. As the signal travels from its source, the signal level lowers due to line losses and attenuation. Accordingly, by the time the signal reaches the NIU, the signal level is considerably lower than 0 dB. In order for the NIU to process the input signal, the signal is regenerated by regenerator 14 for processing by the serial data processor 16. Because the signal regeneration and processing may ultimately affect the signal level, the wave shaper 18 of the present invention must regenerate a signal that has substantially the same amplitude and wave shape as the original input signal received at the RCV IN 10 port. The amplitude of the regenerated signal is controlled by the micro-controller 24. The input signal level from the RCV IN 10 port is coupled to the level detector 26 which outputs a DC signal level equivalent that is received by the micro-controller's RCV ADC 30 input. The micro-controller 24 then translates the DC signal level received at the RCV ADC 30 input to one of thirty-two possible attenuation settings that control the wave shape and amplitude of the signals output from the wave shaper 18.

Figure 4A:
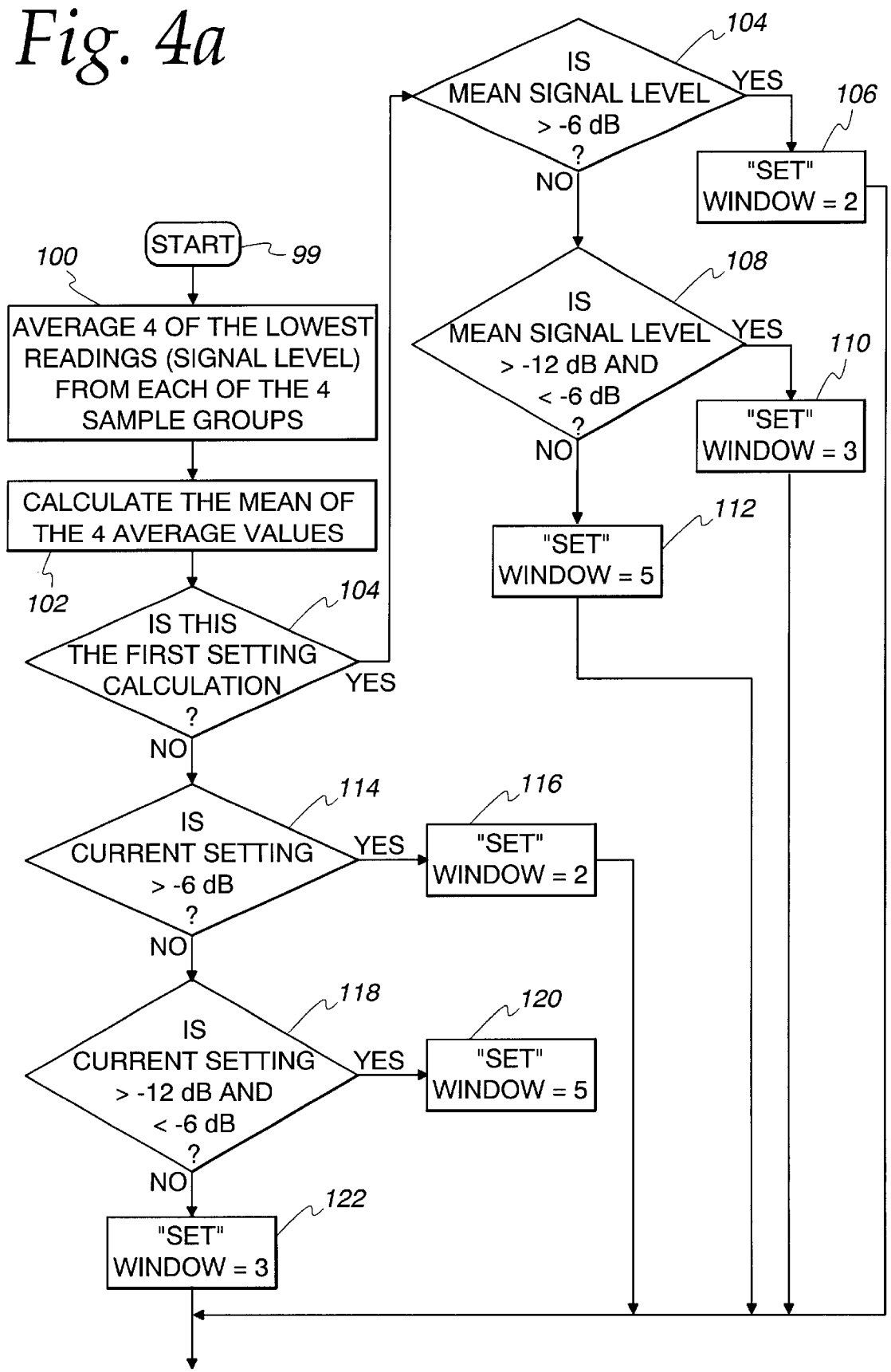
FIG. 4 is a flowchart detailing how the wave shaper circuit attenuation setting is determined.
Figure 4B:
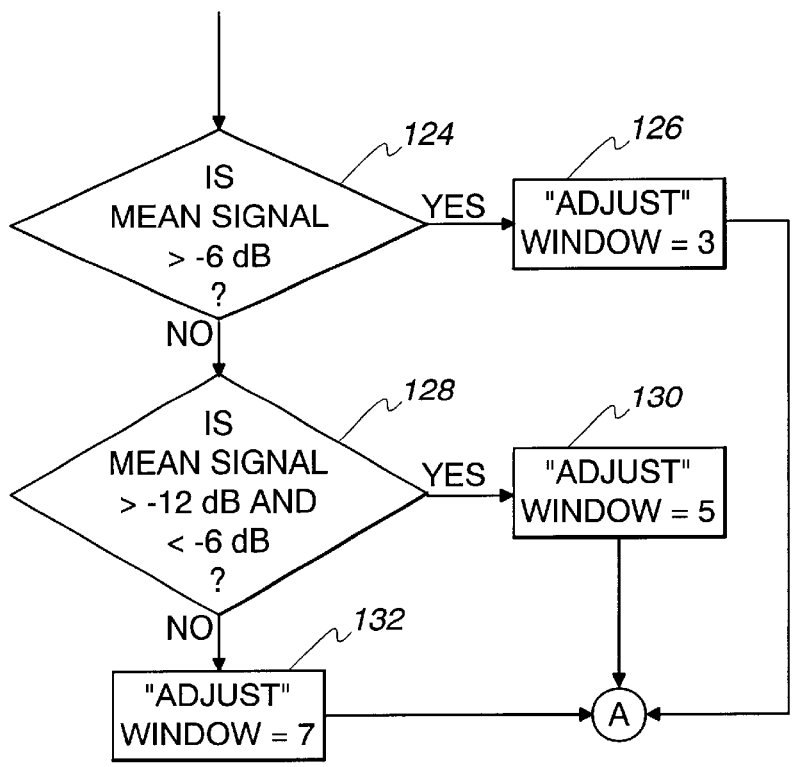
Figure 5:
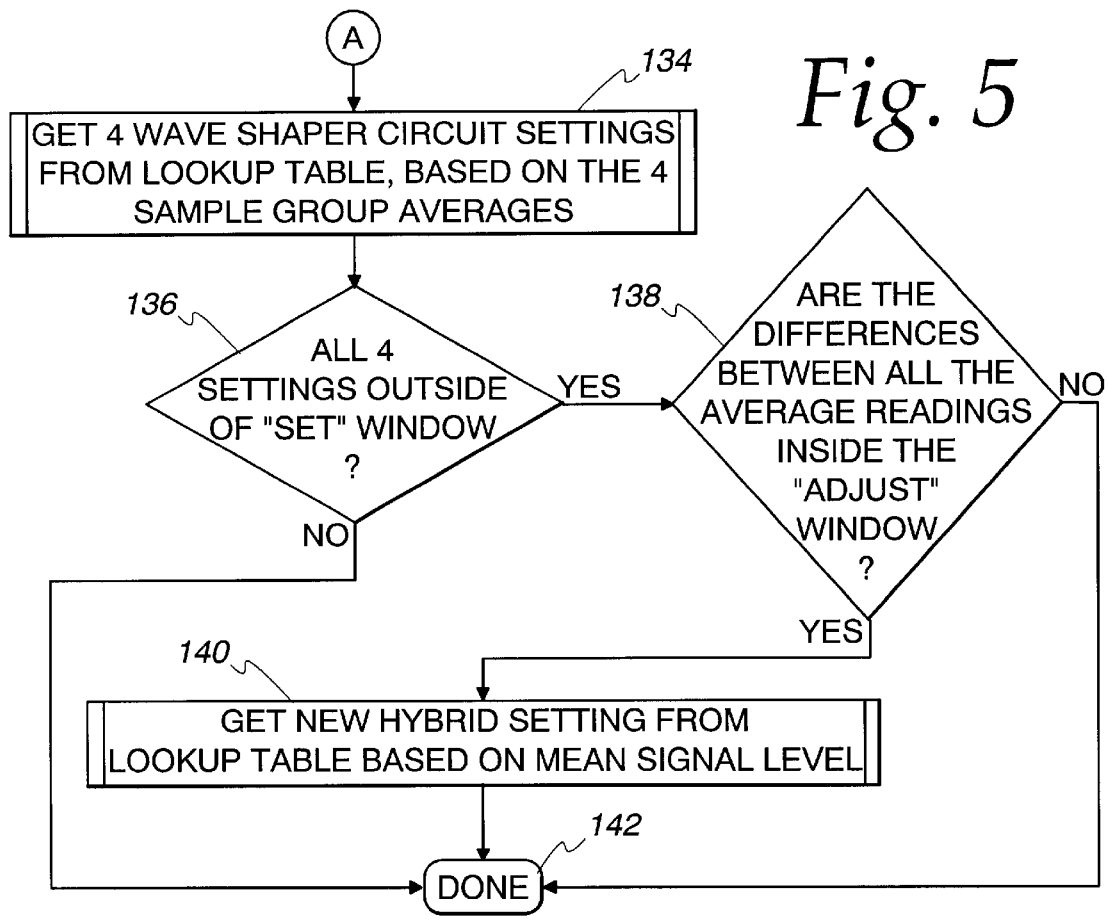
FIG. 5 continues the flowchart of FIG. 4.

In FIG. 3, a more detailed diagram of the wave shaper circuit 18 is shown. The output from the serial data processor 16 is a tri-state digital output (+5V-Open-Gnd) that is first pulse shaped by pulse shaper 58 to represent the regenerated output. In the preferred embodiment, RLC (resistive-inductive-capacitive) "T" section filters simulate sections of 22 gauge cable. These filters attenuate the signal so that the signal will appear as it would if it had actually traversed cable. For example, a 1.5 dB filter will make a T1 signal appear as though it had traveled through approximately 275 feet of cable. Based on the input level sent from the micro-controller 24, the RCV TSP Set Circuitry 32 switches in the appropriate filters. The filters are represented by a 12 dB attenuator 60, a 6 dB attenuator 62, a 3 dB attenuator 64, a 1.5 dB attenuator 66 and a 0.75 dB gain control 70. The individual attenuators, switched respectively via control lead 72, control lead 74, control lead 76, control lead 78, and control lead 80, ultimately simulate cable loss during transmission. The smallest increment of wave shaping is performed by the 0.75 dB gain control 70 adjustment to the high-speed amp 68. There are 32 potential attenuation settings, with the 0.75 dB gain control being either on or off. Of course, a varying number of filters could be used, resulting in fewer or greater potential attenuation settings, without departing from the teachings of the present invention. The high-speed amp 68 consists primarily of an op amp (not shown) which combines with output driver 82 to drive the regenerated and reshaped signal to the transmission media FIGS. 4 and 5 are flowcharts describing how the attenuation setting of the wave-shaper 18 is determined. A lookup table of predetermined attenuation settings is stored in the micro-controller 24 memory. The stored settings are used to regenerate output signals based on the input signal levels. To determine the attenuation setting, the level detector 26 samples incoming line signals from both the central office 8, at RCV IN 10, and from the customer, at XMT IN 36, for one second every 4.1 milliseconds. In that one second period, approximately 200 samples are captured on each incoming line (400 samples total). With respect to each incoming line, the 200 samples taken are divided in to four equal groups of approximately 50 samples.

Referring to FIG. 4, in steps 100 and 102, an average of the four lowest signal levels from each of the four sample groups is calculated, along with the mean of the four average values. In step 104, a determination is made as to whether this is the first attenuation setting calculation. If yes, and if the calculated mean signal is greater than −6 dB, then a value referred to as the set window value is set equal to 2; or if the mean signal level is greater than −12 dB and less than −6 dB, then the set window value is set equal to 3; or if the mean signal level is less than −12 dB, then the set window value is set equal to 5. If this is not the first setting calculation then steps 114–122 are followed, whereby if the current setting is greater than −6 dB, then the set window value is set equal to 2; or if the current setting is greater than −12 dB and less than −6 dB then the set window value is set equal to 3; or if the current setting is less than −12 dB, then the set window value is set equal to 5.

After the set window value is determined, a value referred to as the adjust window value is determined in steps 124–132, whereby if the mean signal level is greater than −6 dB, then the adjust window value is set equal to 3; or if the mean signal level is less than −6 dB and greater than −12 dB, then the adjust window value is set equal to 5; or if the mean signal level is less than −12 dB, then the adjust window value is set equal to 7.

Referring to FIG. 5, and in particular step 134, four wave shaper circuit attenuation settings are selected from the lookup table based on the four calculated sample group averages. In steps 136–142, the attenuation settings and their arithmetic differences are compared to the previously determined "set" and "adjust" window values, respectively, to determine if a new attenuation setting is required. If all four selected attenuation settings are outside the set window value limit and the differences between all average readings are inside the adjust window value limit, then a new attenuation setting is chosen from the lookup table based on the mean signal level; or if all four selected settings are outside of the set window value limit and the differences between all the average readings are not inside the adjust window value limit, then no changes are made to the attenuation setting; or if all four settings are not outside of the set window value limit, then no changes are made to the attenuation setting. The process then repeats itself at start step 99 (FIG. 4).

In operation, the NIU of the present invention receives signals from a high speed transmission media. The signal levels are continuously monitored by a level detector and transmitted to a micro-controller to be used in regenerating the original signals. The digital signal stream is regenerated and output to a serial data processor. The serial data processor is interfaced with a micro-controller, whereby data can be monitored, input to, or extracted from the digital signal stream. The resulting digital signal stream is output from the serial data processor to a wave shaper circuit, where the signals are processed and shaped to have approximately the original wave shape and amplitude as the original input signals entering the NIU. Incoming signal levels are continuously sampled and evaluated to set and automatically determine the proper attenuation setting of the wave shaper circuit. The regenerated signals are then transmitted back out to the network and eventually to customer equipment. The operation of the NIU in the opposite direction, from customer equipment to the central office is identical.

From the foregoing description, it will be apparent that the embodiment of the present invention has a number of advantages, some of which have been described above and others of which are inherent in the embodiment of the present invention. Also, it will be understood that modifications can be made to the embodiment of the present invention without departing from the teachings of the invention. For example the wave shaping function of the present invention can be performed by a digital signal processor, or an active filter shaping process. Also, the serial data processor and other components may function independently of the micro-controller and may include various features not disclosed herein without departing from the scope of the present invention. Finally, there are rare occasions when a NIU is allowed to lower the signal level transmitted to the network in order to protect the proper operation of other network elements. In those instances, the NIU would determine the proper signal level that should be transmitted to the network based on the measured level received from the customer equipment and the network. This type of automatic signal level control could be performed whether or not messages are inserted into the data stream. Modifications to the embodiment of the invention to accomplish this type of automatic signal level control could easily be made by one skilled in the art without departing from the scope of the present invention. Accordingly the scope of the invention is only to be limited as necessitated by the accompanying claims.

We claim:

1. A method of determining the attenuation setting of a wave-shaper circuit used in conjunction with a transmission media, comprising the steps of:

sampling input signal levels received from said media;

calculating average values of said sampled input signal level;

calculating the mean of said average values;

comparing a current attenuation setting to at least one predetermined signal level value;

setting a first signal level limit;

comparing said mean to at least one predetermined signal level value;

selecting attenuation values from a table of predetermined attenuation values based on said average values; and comparing said selected attenuation values to said first signal level limit.

2. A method of determining the attenuation setting of a wave-shaper circuit used in conjunction with a transmission media, comprising the steps of:

sampling input signal levels received from said media;

calculating average values of said sampled input signal levels;

calculating the mean of said average values;

comparing a current attenuation setting to at least one predetermined signal level value;

setting a first signal level limit;

comparing said mean to at least one predetermined signal level value;

setting a second signal level limit;

selecting attenuation values from a table of predetermined attenuation values based on said average values;

comparing said selected attenuation values to said first signal level limit; and comparing said selected attenuation values to said second signal level limit.

3. A method of determining the attenuation setting of a wave-shaper circuit used in conjunction with a transmission media, comprising the steps of:

sampling input signal levels received from said media;

calculating average values of said sampled input signal levels;

calculating the mean of said average values;

comparing a current attenuation setting to at least one predetermined signal level value;

setting a first signal level limit;

comparing said mean to at least one predetermined signal level value;

setting a second signal level limit;

selecting attenuation values from a table of predetermined attenuation values based on said average values;

comparing said selected attenuation values to said first signal level limit;

comparing said selected attenuation values to said second signal level limit; and selecting a new attenuation setting from said table of attenuation values based on said mean signal level.

4. A method of determining the attenuation setting of a wave shaper circuit used in conjunction with a transmission media, comprising the steps of:

sampling input signal levels received from said media;

calculating average values of said sampled input signal levels;

calculating the mean of said average values;

comparing said mean to at least one predetermined signal level value;

setting a first signal level limit;

selecting attenuation values from a table of predetermined attenuation values based on said average values; and comparing said selected attenuation values to said first signal level limit.

5. A method of determining the attenuation setting of a wave shaper circuit used in conjunction with a transmission media, comprising the steps of:

sampling input signal level received from said media;

calculating average values of said sampled input signal levels;

calculating the mean of said average values;

comparing said mean value to at least one predetermined signal level value;

setting a first signal level limit;

setting a second signal level limit;

selecting attenuation values from a table of predetermined attenuation values based on said average values;

comparing said selected attenuation values to said first signal level limit; and comparing said selected attenuation values to said second signal level limit.

6. A method of determining the attenuation setting of a wave shaper circuit used in conjunction with a transmission media, comprising the steps of:

sampling input signal levels received from said media;

calculating average values of said sampled input signal levels;

calculating the mean of said average values;

comparing said mean value to at least one predetermined signal level value;

setting a first signal level limit;

setting a second signal level limit;

selecting attenuation values from a table of predetermined attenuation values based on said average values;

comparing said selected attenuation values to said first signal level limit;

comparing said selected attenuation values to said second signal level limit; and selecting new attenuation settings from said table of attenuation values based on said mean signal level.

* * * * *